United States Patent
Larikova et al.

(10) Patent No.: US 8,374,510 B2
(45) Date of Patent: Feb. 12, 2013

(54) METHOD AND APPARATUS FOR POLARIZATION STABILIZATION IN OPTICAL RECEIVERS WITH COMPLEX MODULATION FORMATS

(75) Inventors: Julia Y. Larikova, Naperville, IL (US); Richard C. Younce, Yorkville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 901 days.

(21) Appl. No.: 12/221,697

(22) Filed: Aug. 6, 2008

(65) Prior Publication Data

US 2009/0285585 A1  Nov. 19, 2009

Related U.S. Application Data

(60) Provisional application No. 61/052,745, filed on May 13, 2008.

(51) Int. Cl.
*H04B 10/04* (2006.01)
*H04B 10/08* (2006.01)

(52) U.S. Cl. ............................ 398/152; 398/33; 398/184

(58) Field of Classification Search ................... 398/25, 398/33, 65, 152, 184
See application file for complete search history.

(56) References Cited

U.S. PATENT DOCUMENTS

| | | | |
|---|---|---|---|
| 5,930,414 A | 7/1999 | Fishman et al. | |
| 6,271,952 B1 | 8/2001 | Epworth | |
| 6,583,903 B1 | 6/2003 | Way et al. | |
| 6,678,431 B2 | 1/2004 | Han et al. | |
| 7,016,567 B2 | 3/2006 | Smith et al. | |
| 7,158,567 B2 * | 1/2007 | Wang et al. | 375/232 |
| 2002/0171888 A1 * | 11/2002 | Melaragni | 359/123 |
| 2002/0186435 A1 | 12/2002 | Shpantzer et al. | |
| 2002/0191903 A1 * | 12/2002 | Neuhauser | 385/24 |
| 2006/0146926 A1 * | 7/2006 | Bhoja et al. | 375/233 |
| 2006/0274320 A1 | 12/2006 | Caplan | |
| 2007/0110451 A1 * | 5/2007 | Rasmussen et al. | 398/158 |
| 2009/0190930 A1 * | 7/2009 | Von Der Weid | 398/81 |
| 2009/0252497 A1 | 10/2009 | Younce et al. | |

OTHER PUBLICATIONS

Sunnerud, et al., "A Comparison Between Different PMD Compensation Techniques," *Journal of Lightwave Technology*, vol. 20, No. 3, pp. 368-378 (Mar. 2002).
Final Office Action dated Sep. 21, 2011 from U.S. Appl. No. 12/082,091.
Non-Final Office Action dated Feb. 7, 2011 from U.S. Appl. No. 12/082,091.

* cited by examiner

*Primary Examiner* — Nathan Curs
(74) *Attorney, Agent, or Firm* — Hamilton, Brook, Smith & Reynolds, P.C.

(57) ABSTRACT

High optical communication rates are making their way into networks initially designed for 10 Gigabits per seconds (Gbps). These higher rates of 40 Gbps and higher have shorter signaling periods and are more susceptible to differential group delay (DGD). A method and corresponding apparatus in an example embodiment of the present invention compensates for polarization state sensitivity of a receiver by determining a performance metric relating to an error rate due to transmission and reception of a modulated optical signal in a medium introducing DGD. Based on the performance metric, a control vector is determined to control a polarization state of the modulated optical signal. The control vector is applied to a polarization effecting device to compensate for the DGD and the polarization state sensitivity of the receiver. Communication rates of 40 Gbps and higher can be used in transmission mediums that introduce DGD through use of embodiments presented.

29 Claims, 6 Drawing Sheets

METHOD AND APPARATUS FOR POLARIZATION STABILIZATION IN OPTICAL RECEIVERS WITH COMPLEX MODULATION FORMATS

RELATED APPLICATION

This application claims the benefit of U.S. Provisional Application No. 61/052,745, filed on May 13, 2008, the entire teachings of which are incorporated herein by reference.

BACKGROUND

Optical transmission techniques deployed to date have been mostly based on intensity modulated signals. Amplitude-shift keying (ASK), also known as on-off keying (OOK), is a simple form of modulation that represents the digital data as variations in the amplitude of its carrier wave. In optical transmission, ASK encodes a bit to a logical "one" in the presence of a pulse of light and to a logical "zero" in the absence or near absence of a light pulse.

Optical dual binary (ODB) is another form of modulation, where the optical signal, at the receiving side of the transmission fiber, is directed to a photo diode. The photo diode converts the light energy to an electrical current, which is subsequently decoded into the received bit stream.

As transmission rates increase above 10 Giga bits per second (Gbps), more complex modulation formats are being developed. These modulation formats generally result in superior performance over other modulation formats such as on-off keying.

At transmission rates of 40 Gbps and higher, phase modulation (PM) is a very popular modulation format. Phase modulation represents a signal as variations of phase of its carrier wave. Phase modulation employs an optical carrier, which for wavelength division multiplexing (WDM) systems is in the range of 190 Tera Hertz (THz). This optical carrier is phase modulated to represent the logical "ones" and "zeros" of the bit stream. Most phase modulated formats are differentially encoded, such that the phase difference between any two successive bit intervals represents a logical "one" or a logical "zero" to the receiver.

Differential phase shift keying (DPSK) is another modulation technique that represents the digital data as variations in the phase of its carrier wave. In differential phase shift keying, the receiver decodes a logical "one" bit if the difference between the phase in the current bit interval differs from the phase of the previous bit interval by one hundred and eighty degrees. If the phase between the current and last interval does not change, the receiver decodes the phase modulated optical carrier as a logical "zero."

SUMMARY

A method or corresponding apparatus in an example embodiment of the present invention compensates for polarization state sensitivity of a receiver by determining a performance metric. The performance metric relates to an error rate due to transmission and reception of a modulated optical signal in a medium introducing differential group delay. Based on the performance metric, a control vector is determined and used to control a polarization state of the modulated optical signal. The control vector is applied to a polarization effecting device, which, in turn, compensates for the differential group delay and the polarization state sensitivity of the receiver.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

An example embodiment of the present invention relates to compensating for polarization state sensitivity of a receiver. A method or corresponding apparatus in this example embodiment compensates for the polarization state sensitivity of a receiver by determining a performance metric. The performance metric relates to an error rate due to transmission and reception of a modulated optical signal in a medium introducing differential group delay. Based on the performance metric, a control vector is determined to control a polarization state of the modulated optical signal. The control vector is applied to a polarization effecting device to compensate for the differential group delay and the polarization state sensitivity of the receiver.

Another example embodiment of the present invention includes a computer program product including a computer readable medium having computer readable code stored thereon, which, when executed by a processor, causes the processor to determine a performance metric related to an error rate due to transmission and reception of a modulated optical signal in a medium introducing differential group delay. The performance metric is used to determine a control vector to control a polarization state of the modulated optical signal. The control vector is applied to a polarization effecting device to compensate for the differential group delay and the polarization state sensitivity of the receiver.

In the view of the foregoing, the following description illustrates example embodiments and features that may be incorporated into a system for compensation of polarization state sensitivity of a receiver, where the term "system" may be interpreted as a system, subsystem, device, apparatus, method, or any combination thereof.

The system may determine the control vector based on the performance metric and polarization state of the modulated optical signal. The system may determine the control vector based on optical power of a demodulated representation of the modulated optical signal. The system may determine the control vector based on the performance metric during startup and, following startup, the system may determine the control vector based on the performance metric and the polarization state. The system may determine the control vector based on two polarization modes. The system may determine the control vector by applying dither control by including dither parameters in the control vector.

The system may determine the performance metric as a function of bit error rate. The system may determine the performance metric as a function of at least one of the following: eye opening, eye height, eye width, or Q-Factor.

The system may determine the error rate from a forward error detection and optionally from an error correction function.

The system may perform polarization beam splitting of the modulated optical signal to measure the polarization state independent of the performance metric.

Figure 1:
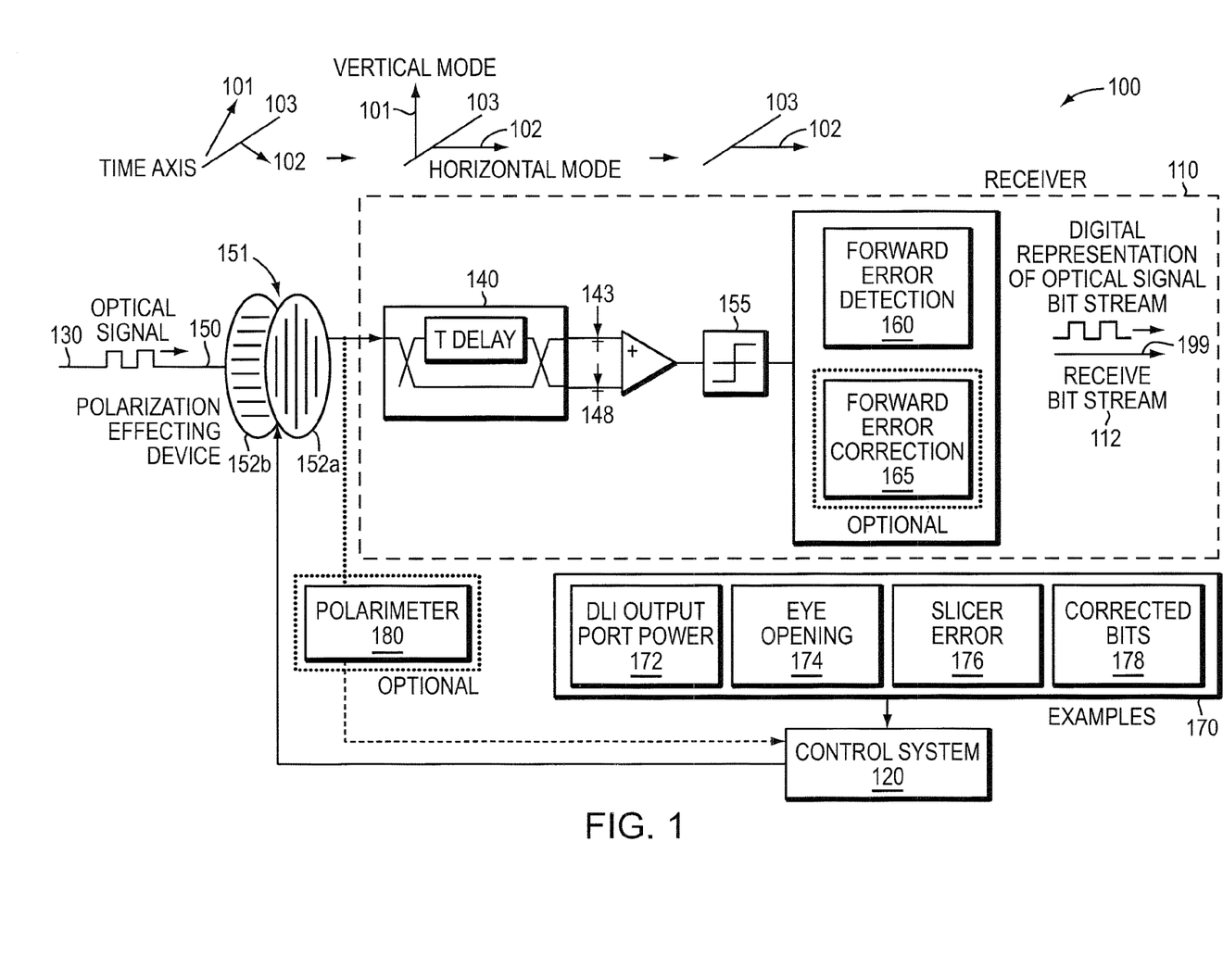
FIG. 1 is a schematic diagram that illustrates an example embodiment of the present invention employing a polarization state sensitivity compensation module.

FIG. 1 illustrates an example embodiment 100 of the present invention employing a receiver 110 with polarization state sensitivity compensation. The receiver 110 may be a differential phase shift keying (DPSK) receiver, and the example embodiment may further include a polarization control system 120.

In this example embodiment, an optical transmitter node (not shown) transmits an optical signal 130 through a transmission path 150, which may include a fiber or free space. The optical signal 130 propagates on the optical path 150 (e.g., an optical fiber) in two different polarization modes 101, 102 about a time axis 103, such that the modulated bit stream exists on two separate electromagnetic waves that are orthogonal to each other. Due to the two different paths of propagation, the optical signal 130 is affected by polarization mode dispersion. At the top of FIG. 1, arrows represent the two polarization modes 101, 102 about the time axis 103 at various points in the example embodiment 100.

Initially, the two modes 101, 102 are split along the time axis 103 with the horizontal mode 102 delayed with respect to the vertical mode 101. Additionally, the two modes 101 and 102 always remain orthogonal to each other along the time axis 103.

A polarization effecting device 151 can rotate the polarization of the optical signal 130, under control of a control system 120, to any particular orientation. The polarization effecting device 151 may be implemented using one or more fiber stretchers. The control system 120 rotates the polarization of the optical signal 130 so that one of the polarization modes (e.g., horizontal mode 102) is aligned with the vertical polarizer 152a along an optical path 150 and the other (e.g., vertical mode 101) is aligned to the horizontal polarizer 152b. A polarization beam splitter (not shown) may be employed to separate the horizontal mode 102 from the vertical mode 101 and send the horizontal mode 102 to the optical receiver 110. It should be understood that in place of the polarization beam splitter, the example embodiment 100 may alternatively employ a filter or other optical element(s) used to separate the polarization modes as described herein.

The polarization effecting device 151 in this example embodiment may be used to maximize the optical power entering the optical receiver 110. Unlike traditional polarization compensators, the polarization effecting device 151 of this example embodiment is not controlled based on polarization alignment with a polarization beam. This simplifies control and reduces both costs and computational complexity.

The optical signal 120 propagates through the optical path 150 and passes through a Delay Line Interferometer (DLI) 140, which acts as an optical demodulator. The delay line interferometer 140 includes output ports that are connected to a pair of photo diodes 143,148. The photo diodes 143,148 convert the optical signal to an electrical signal through a chain of electronics 155, which ultimately results in the receive bit stream 112.

The differential phase comparison or demodulation is performed in the delay line interferometer 140 component. This task may also be implemented in a similar device known as a Mach-Zehnder interferometer (not shown). Delay line interferometer 140 components are free space interferometers. Mach-Zehnder interferometers work on the same interferometric principle but are typically constructed from silica. The delay line interferometer 140 splits the input signal 130 and delays one version of the input signal 130 by the bit period. The delay line interferometer 140 outputs the sum of the current signal plus the delayed signal on its constructive port 143. The delay line interferometer 140 also outputs the difference between the current signal and delayed signal on its destructive port 148.

The delay line interferometer 140 works on the principle of reflection or refraction and also interference. The effect of reflection and refraction is inherently sensitive to the state of polarization of the optical signal 130 entering the delay line interferometer 140. Light propagating in the optical path 150 (e.g. optical fiber) travels as two orthogonal electromagnetic waves. The state of polarization of the optical signal 130 is dependent on the orientation of the waves around the axis of the optical path 150 (e.g., optical fiber) and the relative phase between the two traveling waves.

The performance of the receiver 110 of this example embodiment may vary depending on the state of polarization. Normally, the polarization at the end of the transmission fiber 199 is in a random state and changes over time. If the state of polarization happens to be in a bad state (e.g., polarization misalignment), then performance can worsen to the point of link failure.

The control system 120 is responsible for optimizing and stabilizing the state of polarization. The control system 120 may be analog (e.g., proportional, integral, or differential) or digital (e.g., state space), which may be in form of hardware, firmware, or software. If software, the software may be implemented in any software language consistent with the teachings herein and may be stored on any computer readable medium known or later developed in the art. The software, typically, in form of instructions, can be coded and executed by a processor in a manner understood in the art.

The polarization effecting device 151 may take any arbitrary input state of polarization and transform it to any desired output state of polarization. In order to optimize the state of polarization, a controller 120 determines a state of polarization of the polarization effecting device 151 (i.e., the state of polarization of the delay line interferometer 140 input) that results in the best performance. This is performed as a feedback control loop, where the feedback loop may be configured to maximize some performance measure 170, such as the power of the delay line interferometer 172, eye opening 174, slicer error 176, and/or the number of bit errors 178. When the performance measure 170 is the number of bit errors 178, the example embodiment 100 minimizes the bit error rate, where the number of bit errors 178 is known from a forward error detection block 160 or optionally from a forward error correction block 165.

In order to obtain the state of polarization of the polarization effecting device 151 that results in the best performance, the example embodiment 100 may minimize a slicer error 176. This is similar to maximizing an eye opening measure 174. The example embodiment may employ the optical power 172 of the constructive and destructive output ports 143, 148 of the delay line interferometer 140 to find a good power balance.

It should be noted that the optimal state of polarization is not static. The optimal state may change slowly in time due to changes in the delay line interferometer 140 and interconnect between the polarization effecting device 151 and the delay line interferometer 140. These changes can be due to temperature, vibration, or other possible physical causes. Thus, the optimization control loop remains active for good polarization stabilization performance of the embodiment 100 but the optimization control loop can be run with a low bandwidth.

Once the optimal point is identified in the control system 120, the polarization effecting device 151 is actively controlled to maintain the desired state of polarization while the input state of polarization from the fiber varies over time. An optional polarimeter 180 may be employed to solve this polarization stabilization control function. The polarimeter 180 measures the Stokes vector of the light exiting the polarization effecting device 151. The polarimeter 180 outputs three numeric values that uniquely identify the state of polarization. In this case, the control system 120 drives the polarization effecting device 151 to maintain the optimal state of polarization as represented by the Stokes vector.

It is possible to eliminate the polarimeter 180 device and use a dither-like controller (not shown), which maximizes one of the example performance measure 170 variables (i.e., the power of the delay line interferometer 172, eye opening 174, slicer error 176, and/or the number of bit errors 178).

The example embodiment may be applied to any differential Phase Shift Keying (PSK) signal that uses a polarization sensitive phase demodulator (interferometer).

Figure 2A:
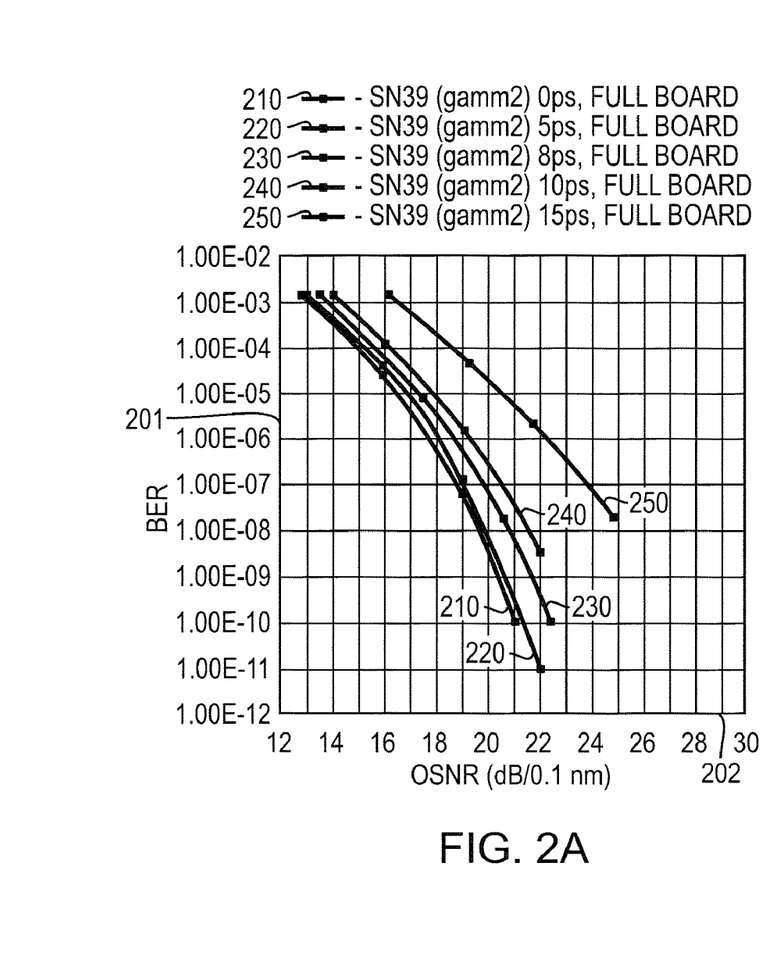
FIGS. 2A and 2B are plots that illustrate bit error rate (BER) performance as a function of additive optical noise at various differential group delay (DGD) values.

FIG. 2A demonstrates the bit error rate 201 (BER) performance as a function of additive optical noise at various differential group delay (DGD) values. In this example, the performance of a forty three Gigabits per second (Gbps) differential phase shift keying (DPSK) receiver in presence of optical noise and differential group delay (i.e., polarization mode dispersion) is measured. The example of FIG. 2A illustrates the bit error rate 201, when the state of polarization is optimized and stabilized according to an example embodiment of the present invention. As shown, the performance or the optical signal to noise ratio 202 (OSNR) of the receiver decreases as the group differential delay increases.

Figure 2B:
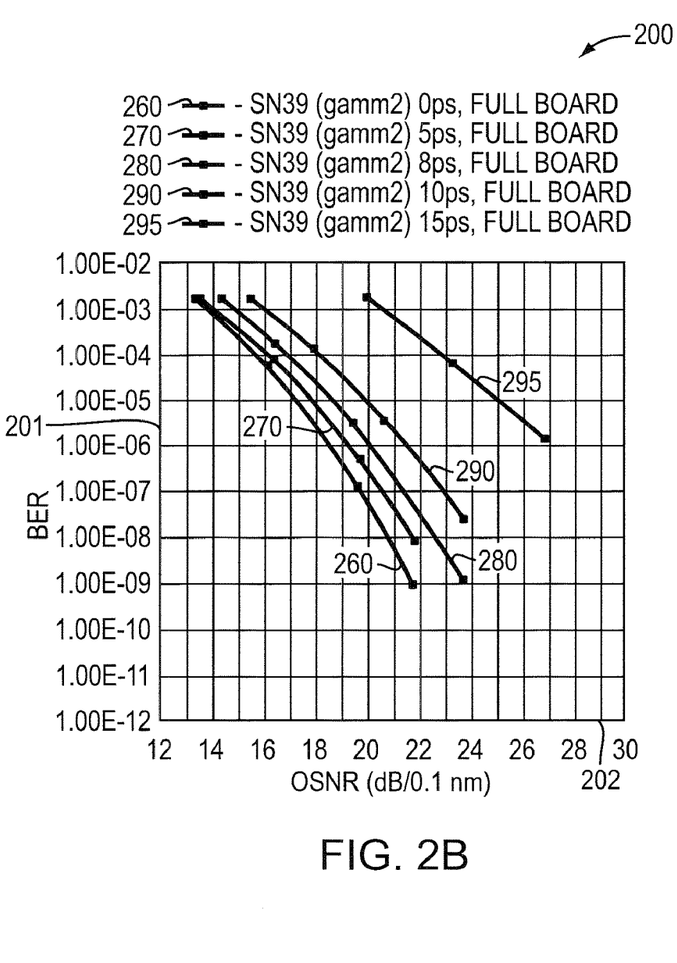

FIG. 2B demonstrates the bit error rate 201 (BER) performance as a function of additive optical noise at various differential group delay (DGD) values. In this example, the performance of a forty three Gigabits per second (Gbps) differential phase shift keying (DPSK) receiver in presence of optical noise and differential group delay (i.e., polarization mode dispersion) is measured. The example of FIG. 2B illustrates the bit error rate 201 when the state of polarization is left uncontrolled. As shown, similar to the example of FIG. 2A, the performance or the optical signal to noise ratio 202 (OSNR) of the receiver decreases as the group differential delay increases. However, comparing plots 210, 220, 230, 240, 250 of FIG. 2A against their corresponding plots 260, 270, 280, 290, 295 in FIG. 2B, it can be seen that the performance 202 degrades rapidly with increasing differential group delay if the state of polarization is left uncontrolled. Thus, the example embodiment employed in FIG. 2A solves the significant problem of performance degradation by controlling and stabilizing the state of polarization.

Figure 3:
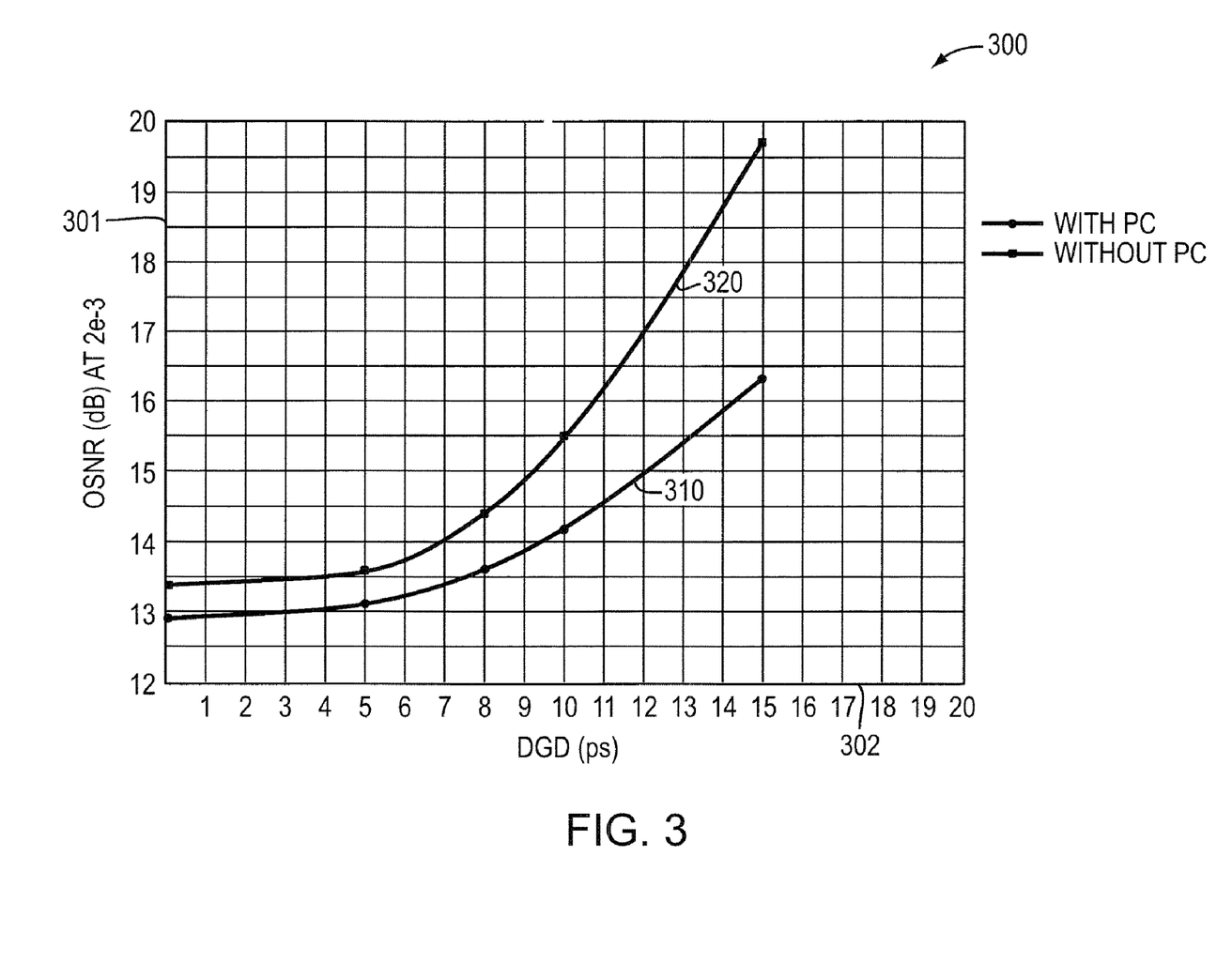
FIG. 3 is a plot that illustrates tolerable noise versus differential group delay with and without state of polarization (SOP)

FIG. 3 is a plot 300 that illustrates tolerable noise versus differential group delay 302 with controlling the state of polarization 310 and without controlling the state of polarization 320. As shown on FIG. 3, the performance 301 degrades rapidly with increasing differential group delay 302 if the state of polarization is left uncontrolled 320. However, this problem of performance 301 degradation is solved when an example embodiment of the present invention is employed to control and stabilize the state of polarization 310.

Figure 4:
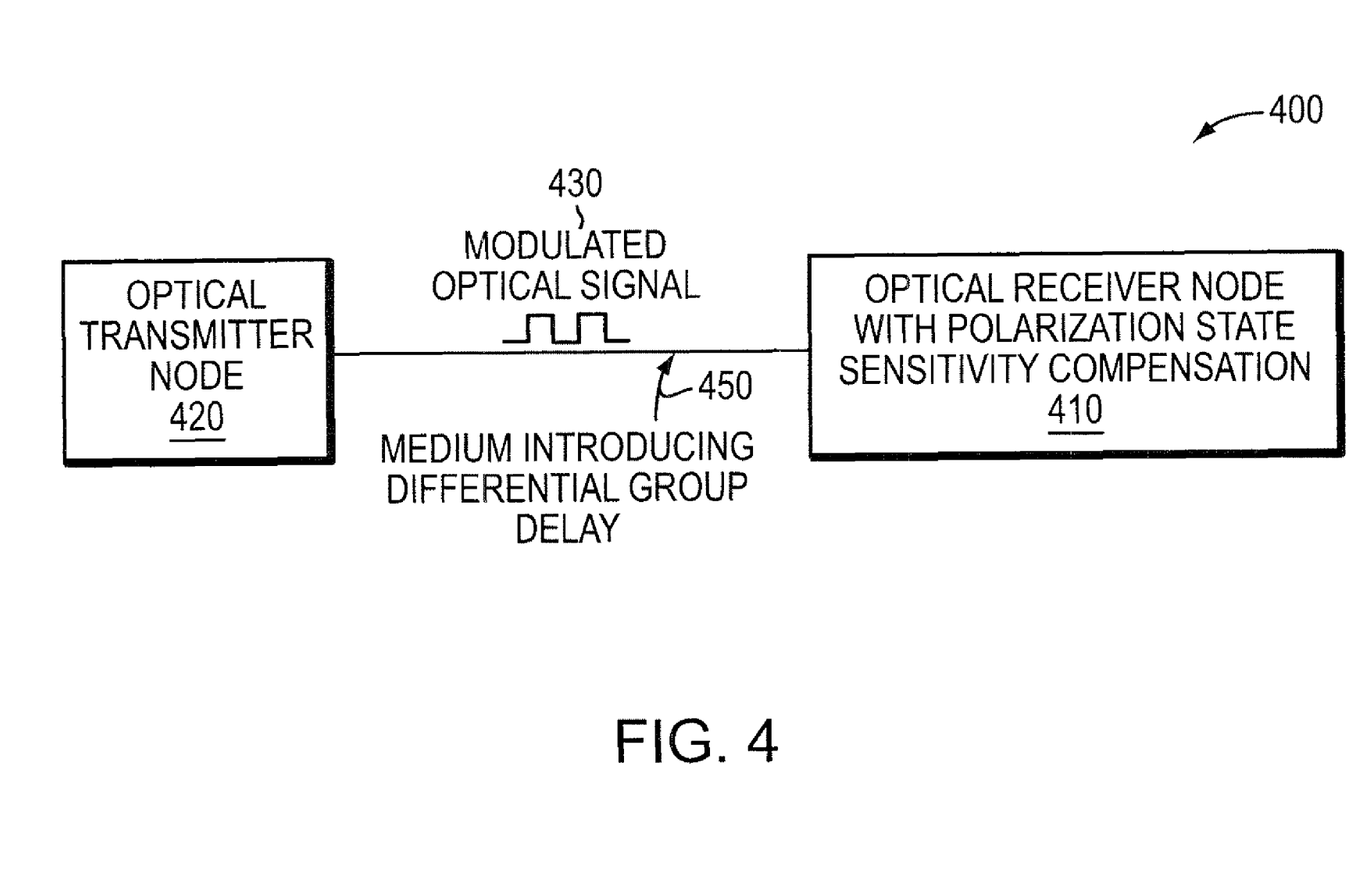
FIG. 4 illustrates an example of an optical communications network with a receiver that employs a polarization state sensitivity compensation module according to an example embodiment of the present invention.

FIG. 4 illustrates an example of an optical communication network 400 with a receiver 410 that employs a polarization state sensitivity compensation module (not shown) according to an example embodiment of the present invention. The receiver 410 may be a differential phase shift keying (DPSK) receiver.

In this example embodiment, an optical transmitter node 420 transmits a modulated optical signal 430 through a transmission medium 450 introducing differential group delay, which may include a fiber or free space.

In order to compensate for the polarization state sensitivity, the optical communications network 400 employs the receiver 410 with the polarization state sensitivity compensation module according to an example embodiment of the invention. The polarization state sensitivity compensation module employs an error rate due to transmission and reception of the modulated optical signal 430 in the medium 450 introducing differential group delay to determine a performance metric. Based on the performance metric, the polarization state sensitivity compensation module determines a control vector that is used to control the polarization state of the modulated optical signal. The polarization state sensitivity compensation module applies the determined control vector to a polarization effecting device to compensate for the differential group delay and the polarization state sensitivity of the receiver.

Figure 5:
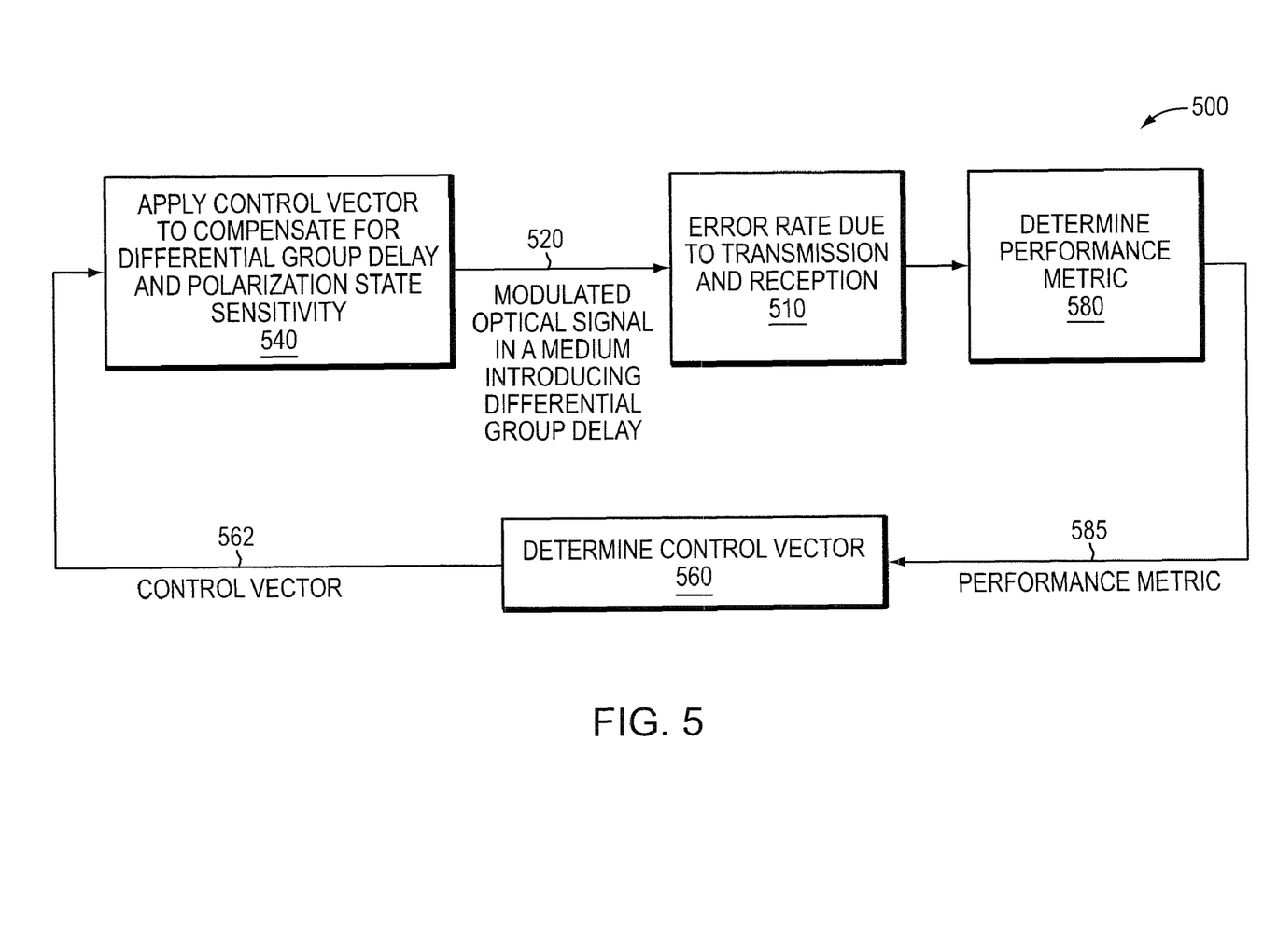
FIG. 5 is a flow diagram of an example embodiment of the present invention.

FIG. 5 is a flow diagram of an example embodiment that compensates for polarization state sensitivity of a receiver (not shown). The example embodiment 500 compensates for polarization state sensitivity and differential group delay of a receiver by determining 580 the performance metric 585. The performance metric 585 is calculated as a function of error rate 510 due to transmission and reception of a modulated optical signal in a medium introducing differential group delay 520.

The performance metric 585 is used to determine 560 a control vector 562. The control vector 562 is arranged to control a polarization state of the modulated optical signal based on the performance metric 585. The control vector 562 is applied 540 to a polarization effecting device (not shown) to compensate for differential group delay and the polarization state sensitivity of the receiver.

Figure 6:
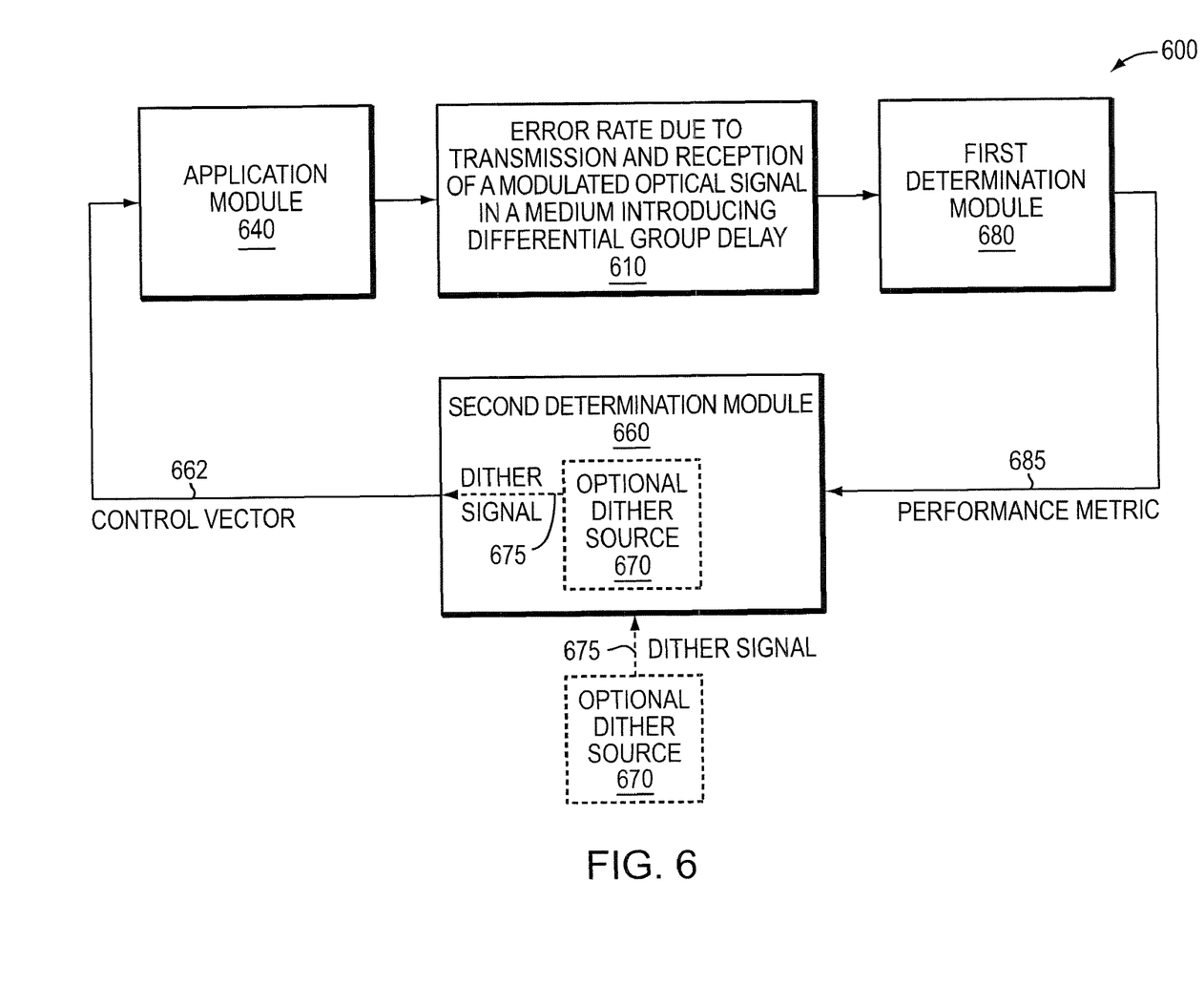
FIG. 6 is a block diagram of an example embodiment of the present invention.

FIG. 6 is a block diagram of an example embodiment of the polarization state sensitivity compensation module 600. The example embodiment 600 includes a first determination module that compensates for polarization state sensitivity and differential group delay of a receiver (not shown) by determining a performance metric 685. The performance metric 685 is calculated as a function of error rate 610 due to transmission and reception of a modulated optical signal in a medium introducing differential group delay.

A second determination module 660 determines a control vector 662 as a function of the performance metric 685. An optional dither source 670 may be also employed. The dither source may be internal or external to the second determination module 660. The second determination module 660 may determine the control vector 662 as a function of the dither signal 672 applied by the dither source as dither parameters in the control vector 662. The control vector 662 is arranged to control a polarization state of the modulated optical signal based on the performance metric 685. An application module 640 applies the control vector 662 to a polarization effecting device (not shown) to compensate for differential group delay and the polarization state sensitivity of the receiver.

It should be understood that procedures, such as those illustrated by flow diagram or block diagram herein or otherwise described herein, may be implemented in the form of hardware, firmware, or software. If implemented in software, the software may be implemented in any software language consistent with the teachings herein and may be stored on any computer readable medium known or later developed in the art. The software, typically, in form of instructions, can be coded and executed by a processor in a manner understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method for compensating for polarization state sensitivity of a receiver, the method comprising:
    determining a performance metric related to an error rate due to transmission and reception of a modulated optical signal in a medium introducing differential group delay;
    determining a control vector to control a polarization state of the modulated optical signal, based on the performance metric, a polarization state of the modulated optical signal, and an optical power of a demodulated representation of the modulated optical signal; and
    applying the control vector to a polarization effecting device to compensate for the differential group delay and the polarization state sensitivity of the receiver.

2. The method of claim 1 further including determining the control vector based on the performance metric during startup and, following startup, determining the control vector based on the performance metric and the polarization state.

3. The method of claim 1 wherein determining the control vector includes determining the control vector based on two polarization modes.

4. The method of claim 1 wherein determining the control vector includes applying dither control by including dither parameters in the control vector.

5. The method of claim 1 wherein determining the performance metric includes determining the performance metric as a function of bit error rate.

6. The method of claim 1 further including determining the performance metric as a function of at least one of the following: eye opening, eye height, eye width, or Q-Factor.

7. The method of claim 1 further including determining the error rate from a forward error detection and optionally correction function.

8. A method for compensating for polarization state sensitivity of a receiver, the method comprising:
    determining a performance metric related to an error rate due to transmission and reception of a modulated optical signal in a medium introducing differential group delay;
    determining a control vector, to control a polarization state of the modulated optical signal, based on the performance metric and polarization state of the modulated optical signal; and
    applying the control vector to a polarization effecting device to compensate for the differential group delay and the polarization state sensitivity of the receiver; and
    further including polarization beam splitting of the modulated optical signal to measure the polarization state independent of the performance metric.

9. The method of claim 8 further including determining the control vector based on the performance metric during startup and, following startup, determining the control vector based on the performance metric and the polarization state.

10. The method of claim 8 wherein determining the control vector includes determining the control vector based on two polarization modes.

11. The method of claim 8 wherein determining the control vector includes applying dither control by including dither parameters in the control Vector.

12. The method of claim 8 wherein determining the performance metric includes determining the performance metric as a function of bit error rate.

13. The method of claim 8 further including determining the performance metric as a function of at least one of the following: eye opening, eye height, eye width, or Q-Factor.

14. The method of claim 8 further including determining the error rate from a forward error detection and optionally correction function.

15. An apparatus for compensating for polarization state sensitivity of a receiver, the apparatus comprising:
    a first determination module to determine a performance metric related to an error rate due to transmission and reception of a modulated optical signal in a medium introducing differential group dela
    a second determination module, to determine a control vector to control a polarization state of the modulated optical signal, based on the performance metric, a polarization state of the modulated optical signal, and an optical power of a demodulated representation of the modulated optical signal, and
    an application module to apply the control vector to a polarization effecting device to compensate for the differential group delay and the polarization state sensitivity of the receiver.

16. The apparatus of claim 15 wherein the second determination module is arranged to determine the control vector based on the performance metric during startup and, following startup, determine the control vector based on the performance metric and the polarization state.

17. The apparatus of claim 15 wherein the second determination module is arranged to determine the control vector as a function of determining the control vector based on two polarization modes.

18. The apparatus of claim 15 further including a dither source and wherein the second determination module is arranged to determine the control vector as a function of dither applied by the dither source as dither parameters in the control vector.

19. The apparatus of claim 15 wherein the first determination module is arranged to determine the performance metric as a function of determining the performance metric as a function of bit error rate.

20. The apparatus of claim 15 wherein the first determination module is further arranged to determine the performance metric as a function of at least one of the following: eye opening, eye height, eye width, or Q-Factor.

21. The apparatus of claim 15 further including a third determination module to determine the error rate from a forward error detection and optionally correction function.

22. An apparatus for compensating for polarization state sensitivity of a receiver, the apparatus comprising:
    a first determination module to determine a performance metric related to an error rate due to transmission and reception of a modulated optical signal in a medium introducing differential group delay;

a second determination module to determine a control vector, to control a polarization state of the modulated optical signal, based on the performance metric; and an application module to apply the control vector to a polarization effecting device to compensate for the differential group delay and the polarization state sensitivity of the receiver; and further including a polarization beam splitter arranged to perform polarization beam splitting of the modulated optical signal to measure the polarization state independent of the performance metric.

23. The apparatus of claim 22 wherein the second determination module is arranged to determine the control vector based on the performance metric during startup and, following startup, determine the control vector based on the performance metric and the polarization state.

24. The apparatus of claim 22 wherein the second determination module is arranged to determine the control vector as a function of determining the control vector based on two polarization modes.

25. The apparatus of claim 22 further including a dither source and wherein the second determination module is arranged to determine the control vector as a function of dither applied by the dither source as dither parameters in the control vector.

26. The apparatus of claim 22 wherein the first determination module is arranged to determine the performance metric as a function of determining the performance metric as a function of bit error rate.

27. The apparatus of claim 22 wherein the first determination module is further arranged to determine the performance metric as a function of at least one of the following: eye opening, eye height, eye width, or Q-Factor.

28. The apparatus of claim 22 further including a third determination module to determine the error rate from a forward error detection and optionally correction function.

29. A computer program product comprising a computer readable medium having computer readable code stored thereon, which, when executed by a processor, causes the processor to:

determine a performance metric related to an error rate due to transmission and reception of a modulated optical signal in a medium introducing differential group delay;

determine a control vector, to control a polarization state of the modulated optical signal, based on the performance metric, a polarization state of the modulated optical signal, and an optical power of a demodulated representation of the modulated optical signal; and apply the control vector to a polarization effecting device to compensate for the differential group delay and the polarization state sensitivity of the receiver.

* * * * *

UNITED STATES PATENT AND TRADEMARK OFFICE
CERTIFICATE OF CORRECTION

PATENT NO. : 8,374,510 B2  Page 1 of 1
APPLICATION NO. : 12/221697
DATED : February 12, 2013
INVENTOR(S) : Julia Y. Larikova and Richard C. Younce It is certified that error appears in the above-identified patent and that said Letters Patent is hereby corrected as shown below:

In the Claims:

Column 8, line 10, Claim 11, delete "Vector" and insert --vector--.

Column 8, line 26, Claim 15, delete "dela" and insert --delay;--.

Column 8, line 32, Claim 15, delete "," and insert --;--.

Signed and Sealed this
Twenty-third Day of April, 2013

Teresa Stanek Rea
*Acting Director of the United States Patent and Trademark Office*